United States Patent
Blonde et al.

(10) Patent No.: US 12,367,601 B2
(45) Date of Patent: Jul. 22, 2025

(54) APPARATUS AND A METHOD FOR GENERATING DATA REPRESENTATIVE OF A PIXEL BEAM

(71) Applicant: INTERDIGITAL CE PATENT HOLDINGS, Paris (FR)

(72) Inventors: Laurent Blonde, Thorigne-Fouillard (FR); Didier Doyen, La Bouexiere (FR); Guillaume Boisson, Pleumeleuc (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 16/317,206

(22) PCT Filed: Jul. 11, 2017

(86) PCT No.: PCT/EP2017/067314
§ 371 (c)(1),
(2) Date: Jan. 11, 2019

(87) PCT Pub. No.: WO2018/011159
PCT Pub. Date: Jan. 18, 2018

(65) Prior Publication Data
US 2019/0295276 A1    Sep. 26, 2019

(30) Foreign Application Priority Data
Jul. 11, 2016   (EP) .................................. 16305870

(51) Int. Cl.
*G06T 7/557* (2017.01)
*G02B 27/00* (2006.01)
(Continued)

(52) U.S. Cl.
CPC .......... *G06T 7/557* (2017.01); *G02B 27/0025* (2013.01); *G02B 27/0955* (2013.01);
(Continued)

(58) Field of Classification Search
CPC ............ G02B 27/0025; G02B 27/0955; G06T 2207/10052; G06T 7/557; H04N 13/106;
(Continued)

(56) References Cited

U.S. PATENT DOCUMENTS

| | | | |
|---|---|---|---|
| 7,496,241 B1 | 2/2009 | Reneker et al. | |
| 9,286,680 B1 * | 3/2016 | Jiang | H04N 23/90 |

(Continued)

FOREIGN PATENT DOCUMENTS

| | | |
|---|---|---|
| CN | 101276063 A | 10/2008 |
| CN | 101426085 A | 5/2009 |

(Continued)

OTHER PUBLICATIONS

Fehn etal.—"Depth-image-based rendering (DIBR), compression, and transmission for a new approach on 3D-TV"—Proceedings of the International Society for Optical Engineering (SPIE), vol. 5291, n° 2 May 31, 2004 (May 31, 2004), pp. 93-104.
(Continued)

*Primary Examiner* — Zhiyu Lu
(74) *Attorney, Agent, or Firm* — Condo Roccia Koptiw LLP (57) ABSTRACT

There are several types of plenoptic devices having their proprietary file format. At present there is no standard supporting the acquisition and transmission of multi-dimensional information for an exhaustive over-view of the different parameters upon which a light-field depends. As such acquired light-field data for different cameras have a diversity of formats. The notion of pixel beam, which represents a volume occupied by a set of rays of light in an object space of an optical system of a camera is thus introduced. The method according to the invention enables to provide data representative of a collection of pixel beams describing a first optical system that is agnostic since these data are
(Continued)

obtained by imaging the collection of pixel beams through a second optical system. Such data representative of a collection of pixel beams enable the generation of parameterized output images from which post-processing.

12 Claims, 7 Drawing Sheets

(51) Int. Cl.
  *G02B 27/09* (2006.01)
  *H04N 13/106* (2018.01)
  *H04N 13/243* (2018.01)
  *H04N 13/25* (2018.01)
(52) U.S. Cl.
  CPC ......... *H04N 13/106* (2018.05); *H04N 13/243* (2018.05); *H04N 13/25* (2018.05); *G06T 2207/10052* (2013.01)
(58) Field of Classification Search
  CPC ................. H04N 13/243; H04N 13/25; A63F 2300/1012
  See application file for complete search history.

(56) References Cited

U.S. PATENT DOCUMENTS

| | | | |
|---|---|---|---|
| 9,445,003 B1* | 9/2016 | Lelescu | H04N 23/45 |
| 9,497,380 B1* | 11/2016 | Jannard | H04N 23/90 |
| 9,613,256 B2* | 4/2017 | Ghasemi | G06T 7/13 |
| 2003/0058916 A1* | 3/2003 | Tanaka | B23K 26/0604 |
| | | | 372/101 |
| 2005/0088440 A1* | 4/2005 | Sloan | G06T 15/55 |
| | | | 345/426 |
| 2006/0139575 A1* | 6/2006 | Alasaarela | G02B 5/06 |
| | | | 353/31 |
| 2008/0259429 A1 | 10/2008 | Kamm et al. | |
| 2011/0075257 A1* | 3/2011 | Hua | G02B 27/0172 |
| | | | 359/464 |
| 2011/0229013 A1* | 9/2011 | Huang | H04N 13/246 |
| | | | 348/46 |
| 2013/0113981 A1 | 5/2013 | Knight et al. | |
| 2013/0308035 A1 | 11/2013 | Diasa et al. | |
| 2013/0342526 A1* | 12/2013 | Ng | G06T 15/005 |
| | | | 345/419 |
| 2014/0181630 A1* | 6/2014 | Monney | G06F 16/444 |
| | | | 715/232 |
| 2014/0267608 A1* | 9/2014 | Dhome | G06T 7/80 |
| | | | 348/43 |
| 2014/0300602 A1* | 10/2014 | Nam | H04N 13/243 |
| | | | 345/426 |
| 2015/0177062 A1 | 6/2015 | Nishiyama | |
| 2015/0201176 A1* | 7/2015 | Graziosi | H04N 13/243 |
| | | | 348/43 |
| 2015/0264250 A1 | 9/2015 | Ou et al. | |
| 2015/0355811 A1* | 12/2015 | Ybanez Zepeda | G06F 3/0488 |
| | | | 715/810 |
| 2016/0267720 A1* | 9/2016 | Mandella | G06F 3/03545 |
| 2016/0277729 A1* | 9/2016 | Lee | H04N 13/363 |
| 2016/0307372 A1* | 10/2016 | Pitts | H04N 23/957 |
| 2017/0032569 A1* | 2/2017 | Rondao Alface | H04N 13/282 |
| 2017/0046821 A1* | 2/2017 | Hayasaka | G06T 3/4038 |
| 2018/0012397 A1* | 1/2018 | Carothers | H04N 5/22541 |
| 2018/0047185 A1* | 2/2018 | Boisson | H04N 13/111 |
| 2018/0131861 A1* | 5/2018 | Schillebeeckx | G03B 13/36 |

FOREIGN PATENT DOCUMENTS

| | | | | |
|---|---|---|---|---|
| CN | 102282590 A | | 12/2011 | |
| CN | 104952063 | * | 9/2015 | ........... G06T 19/006 |
| EP | 3144887 A1 | | 3/2017 | |
| EP | 3144888 A1 | | 3/2017 | |
| EP | 3145168 A1 | | 3/2017 | |
| EP | 3288253 A1 | | 2/2018 | |
| GB | 2501950 | | 11/2013 | |
| GB | 2505954 | | 3/2014 | |
| WO | 2010/120591 A1 | | 10/2010 | |

OTHER PUBLICATIONS

Hartley etal.—"Multiple view geometry"—Jun. 1, 1999 (Jun. 1, 1999)—retrieved from the Internet: URL:http://users.rsise.anu.edu.au/hartley/public_html/Papers/CVPR99-tutorial/tut_4up.pdf [retrieved on Jan. 18, 2012]—p. 1-2.

Levoy etal.—"Light field rendering"—Computer Graphics Proceedings 1996 (Siggraph), New Orleans—Aug. 4-9, 1996, [Computer Graphics Proceedings (Siggraph)], ACM, New York, US—Aug. 4, 1996 (Aug. 4, 1996) pp. 31-42.

http://cameramaker.se/plenoptic.htm (see "The unprocessed light field image" and "Detail of the light field image"), Dec. 2014.

Ng—"Fourier slice photography"—ACM Transactions on Graphics (TOG)—Proceedings of ACM Siggraph 2005, vol. 24, Issue 3, pp. 735-744, Jul. 2005.

Perwass etal.—"Single Lens 3D-Camera with Extended Depth-of-Field"—Proceedings SPIE vol. 8291—Human Vision and Electronic Imaging XVII, 829108, Feb. 18, 2012.

Levin etal.,"Understanding camera trade-offs through a Bayesian analysis of light field projections"—Computer Vision—ECCV 2008—vol. 5305 of the series Lecture Notes in Computer Science—Proceedings of the 10th European Conference on Computer Vision: Part IV—pp. 88-101—Oct. 12-18, 2008.

Park et al., "Light ray field capture using focal plane sweeping and its optical reconstruction using 3D displays", Optics Express, vol. 22, No. 21, pp. 25444-25454, Oct. 2014.

Ng, "Digital Light Field Photography", Doctoral dissertation submitted to the Department of Computer Science and the Committee on graduate studies of Stanford University, Jul. 2006.

Wanner etal.—"Generating EPI Representations of 4D Light Fields with a Single Lens Focused Plenoptic Camera"—Advances in Visual Computing—7th International Symposium, ISVC 2011—vol. 6938 of the series Lecture Notes in Computer Science—pp. 90-101—Sep. 26-28, 2011.

International Search Report for PCT/EP17/067314 dated Oct. 5, 2017.

* cited by examiner

APPARATUS AND A METHOD FOR GENERATING DATA REPRESENTATIVE OF A PIXEL BEAM

CROSS REFERENCE TO RELATED APPLICATIONS

This application is the national stage entry under 35 U.S.C. § 371 of International Application PCT/EP17/067314, filed Jul. 11, 2017, which was published in accordance with PCT Article 21(2) on Jan. 18, 2018 in English and which claims the benefit of European patent application 16305870.4, filed Jul. 11, 2016.

TECHNICAL FIELD

The present invention relates to generation of data representing a light field and provide realism in the rendered data.

BACKGROUND

The acquisition of four-dimensional or 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. A plenoptic camera comprises a main lens, a microlens array comprising a plurality of micro-lenses arranged in a two-dimensional array and an image sensor. Another way to acquire 4D light-field data is to use a camera array which comprises a lens array and an image sensor.

In the example of the plenoptic camera, the main lens receives light from an object in an object field of the main lens and passes the light through an image field of the main lens.

At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph. D dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "*Generating EPI Representation of a 4D Light Fields with a Single Lens Focused Plenoptic Camera*", by S. Wanner and al., published in the conference proceedings of ISVC 2011.

Light-field acquisition devices are extremely heterogeneous. Light-field cameras are of different types for example plenoptic or camera arrays. Within each type there are many differences such as different optical arrangements, or micro-lenses of different focal lengths.

Each camera has its own proprietary file format. As such acquired light-field data for different cameras have a diversity of formats.

In "*Fourier Slice Photography*", by Ren Ng, in ACM Transactions on Graphics (ToG), vol. 24, no 3, pp. 735-744.ACM, 2005, the author describes a theorem that, in the Fourier domain, a photograph formed by a full aperture is a 2D slice in the 4D light-field. This theorem is used to analyse the performance of digital refocusing where one computes photographs focused at different depth from a single light field. Furthermore, this theorem yields a Fourier-domain algorithm for digital refocusing, where an appropriate 2D slice of the light field's Fourier transform and perform an inverse Fourier transform. Such a solution however requires a high computational load since in involves working in the Fourier domain.

The present invention has been devised with the foregoing in mind.

SUMMARY OF INVENTION

According to a first aspect of the invention there is provided a computer implemented method for generating data representative of for at least one volume in an object space of a first optical system occupied by a set of rays of light passing through a pupil of said first optical system and a conjugate, in said object space of the first optical system, of at least one pixel of a sensor associated to said first optical system, said volume occupied by said set of rays of light being called a pixel beam, comprising:
  computing a conjugate of said at least one pixel beam through a second optical system, called imaged pixel beam,
  computing a value of a parameter representing a radiance transmitted through an imaged pixel beam associated to at least one element of a grid defined on a projection surface located at a distance D from the second optical system and belonging to an intersection between said at least one imaged pixel beam and the projection surface.

Such a method enables the creation of an image, in its common definition i.e. a group of picture elements sampled on regular grid, from a collection of pixel beams imaged in a focal volume of an optical system.

Indeed, a collection of pixel beams imaged in a focal volume of a second optical system provides data representative of said collection of pixel beams describing a first optical system that is agnostic, i.e. which is independent of the camera embedding the optical system, since these data are obtained by imaging the collection of pixel beams through the second optical system.

However, such a collection of imaged pixel beams paves with overlaps the focal volume depending on the structure and parameters of the second optical system such as its orientation, position and focal length.

By computing an image of a collection of pixel beams describing a first optical system through a second optical system which provides a representation of the object space of several optical systems embedded in various cameras in a dual and compact space which corresponds to a focal volume of the optical system and a value of the radiance of an imaged pixel beam associated to an element of a grid on a projection surface, it possible to sort the collection of imaged pixel beams in order to obtain a picture which can be used in post-processing operations.

In an embodiment of the method according to the invention, the grid on the projection surface is a pixel grid.

When the grid is a pixel grid, the pixel beam collection is directly sorted based on the pixel grid and thus on the image.

In an embodiment of the method according to the invention, an over-sampled grid is defined on the projection surface, the elements of said over-sampled grid being smaller than the pixel of the pixel grid.

This enables to accumulate the value of the radiance pixel beam associated to an element of the over-sampled grid. Thus the value of the radiance is computing with greater accuracy.

In an embodiment of the method according to the invention, the value of a parameter representing a radiance transmitted through an imaged pixel beam is computed for pixel beams intersecting the projection surface.

This reduces the computational load when the method according to this embodiment of the method according to the invention.

In an embodiment of the method according to the invention, a selection of pixel beams for which a conjugate is intended to be computed is done by selecting the pixel beams which section is included in a restitution pupil is defined in the second optical system.

Such a pupil is defined by its shape, for example a circular shape defined by its radius, and its position relative to the optical centre of the second optical system. This pupil reduce the number of pixel beams to be processed by allowing the processing of pixel beams for which the whole section is inside the restitution pupil.

In an embodiment of the method according to the invention, the value of a parameter representing a radiance transmitted through an imaged pixel beam is computed for pixel beams intersecting the projection surface and which section is included in a restitution pupil is defined in the second optical system.

This reduces the computational load when the method according to this embodiment of the method according to the invention.

Another aspect of the invention is an apparatus for generating data representative of at least one volume in an object space of a first optical system occupied by a set of rays of light passing through a pupil of said first optical system and a conjugate, in said object space of the first optical system, of at least one pixel of a sensor associated to said first optical system, said volume occupied by said set of rays of light being called a pixel beam, said apparatus comprising a processor configured to:
  compute a conjugate of said at least one pixel beam through a second optical system, called imaged pixel beam,
  compute a value of a parameter representing a radiance transmitted through an imaged pixel beam associated to at least one element of a grid defined on a projection surface located at a distance D from the second optical system and belonging to an intersection between said at least one imaged pixel beam and the projection surface.

In an embodiment of the apparatus according to the invention, wherein the grid on the projection surface is a pixel grid.

In an embodiment of the apparatus according to the invention, an over-sampled grid is defined on the projection surface, the elements of said over-sampled grid being smaller than the pixel of the pixel grid.

In an embodiment of the apparatus according to the invention, the value of a parameter representing a radiance transmitted through an imaged pixel beam is computed for pixel beams intersecting the projection surface.

In an embodiment of the apparatus according to the invention, selecting pixel beams for which a conjugate is intended to be computed is done by selecting the pixel beams which section is included in a restitution pupil is defined in the second optical system.

In an embodiment of the apparatus according to the invention, the value of a parameter representing a radiance transmitted through an imaged pixel beam is computed for pixel beams intersecting the projection surface and which section is included in a restitution pupil is defined in the second optical system.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

For any optical acquisition system, may it be plenoptic or not, in addition to raw images or epipolar images representing 4D light-field data captured by the optical acquisition system, it is interesting to obtain information related to a correspondence between pixels of a sensor of said optical acquisition system and an object space of said optical acquisition system. Knowing which portion of the object space of an optical acquisition system a pixel belonging to the sensor of said optical acquisition system is sensing enables the improvement of signal processing operations such as de-multiplexing, de-mosaicking, refocusing, etc., and the mixing of images captured by different optical systems with different characteristics. Furthermore, information related to the correspondence between the pixels of the sensor of the optical acquisition system and the object space of said optical acquisition system are independent of the optical acquisition system.

Figure 1:
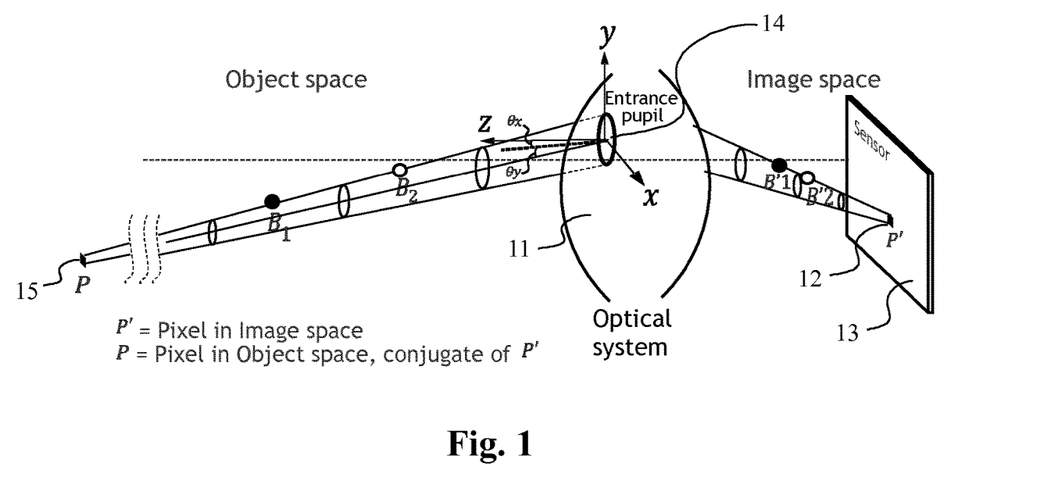
FIG. 1 shows a volume occupied by a set of rays of light passing through a pupil of an optical system of a camera.

The present disclosure introduces the notion of pixel beam 10, shown on FIG. 1, which represents a volume occupied by a set of rays of light passing through a pupil of an optical system 11 of a camera (not shown on FIG. 1) and a conjugate of a pixel of a sensor of the camera in an object space of the optical system in a direction normal to a surface of the pupil The set of rays of light is sensed by a pixel 12 of a sensor 13 of the camera through a pupil 14 of said optical system 11. The optical system 11 may be a combination of lenses fit for photo or video cameras. A pupil of an optical system is defined as the image of an aperture stop as seen through said optical system, i.e. the lenses of the optical acquisition system, which precedes said aperture stop. An aperture stop is an opening which limits the amount of light which passes through the optical system of the optical acquisition system. For example, an adjustable blade diaphragm located inside a camera lens is the aperture stop for the lens. The amount of light admitted through the diaphragm is controlled by the diameter of the diaphragm opening which may adapted depending of the amount of light a user of the camera wishes to admit. For example, making the aperture smaller reduces the amount of light admitted through the diaphragm, and, simultaneously, increases the depth of focus. The apparent size of a stop may be larger or smaller than its physical size because of the refractive action of a portion of the lens. Formally, a pupil is the image of the aperture stop through all lenses of the optical acquisition system located between the physical stop and the observation space.

A pixel beam 10 is defined as a pencil of rays of light that reaches a given pixel 12 when propagating through the optical system 11 via an entrance pupil 14. As light travels on straight lines in free space, the shape of such a pixel beam 10 can be defined by two sections, one being the conjugate 15 of the pixel 12, and the other being the entrance pupil 14. The pixel 12 is defined by its non-null surface and its sensitivity map.

Figure 2:
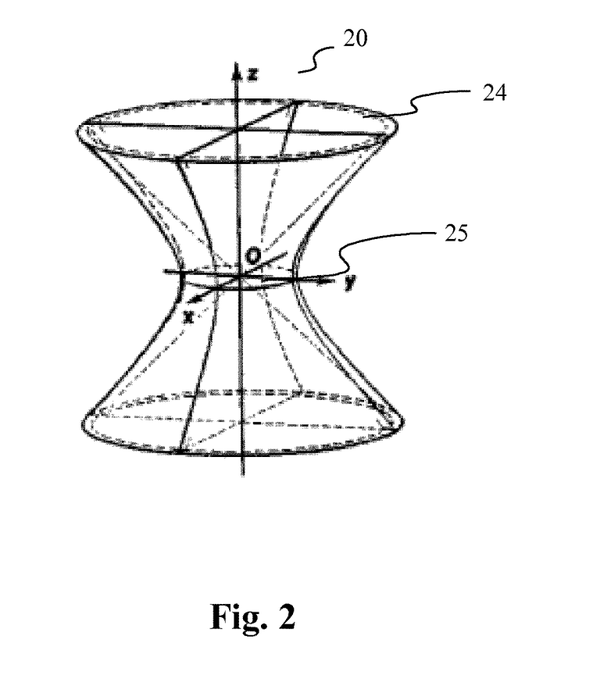
FIG. 2 shows a hyperboloid of one sheet representing a pixel beam according to an embodiment of the invention.

In a first embodiment of the invention, a pixel beam 30 may be represented by an hyperboloid of one sheet, as shown on FIG. 2, supported by two elements: the pupil 24 and the conjugate 25 of the pixel 12 in the object space.

A hyperboloid of one sheet is a ruled surface that can support the notion of pencil of rays of light and is compatible with the notion of "ëtendue" of physical light beams, notion linked to the preservation of energy across sections of the physical light beams.

Figure 3:
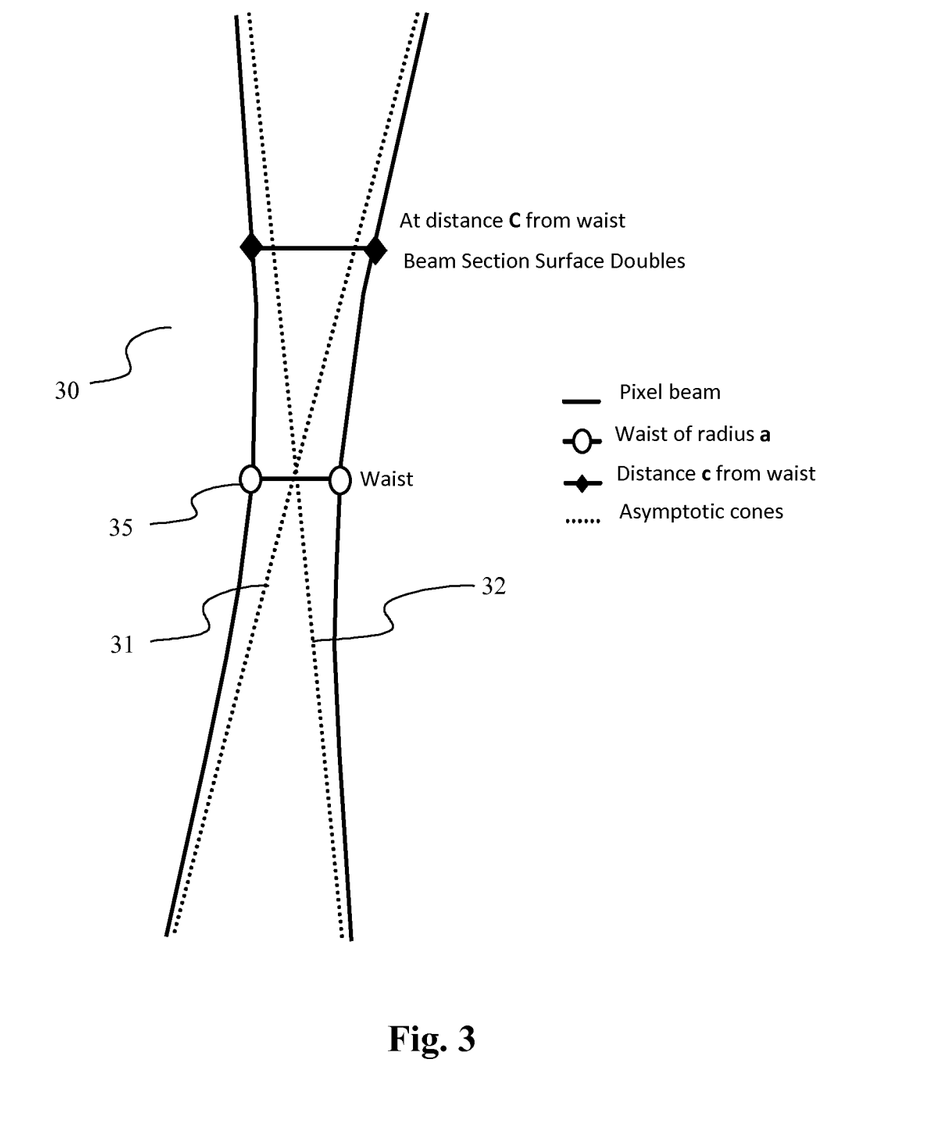
FIG. 3 shows a hyperboloid of one sheet and its asymptotic cones.

As represented on FIG. 3, an hyperboloid of one sheet 30 is mostly identical to its asymptotic cones 31, 32, except in the fundamental region of its smallest section, called the waist 35, which corresponds to the conjugate 15 in the object space. For plenoptic systems, such as light-field cameras, this is the region where space sampling by multiple path rays is performed. Sampling space with unique cones degenerating to a point in this region is not adequate, as pixel 12 sensitivity is significant on some tens of square microns on its surface and cannot be represented by a mathematical point with infinitely small surface as would be a cone tip.

In an embodiment of the invention, each pixel beam 10, 20, 30, is defined by four independent parameters: $z_P$, $\theta_x$, $\theta_y$, a defining the position and size of the pixel conjugate 15, 35, in front of the pupil 14, 24 and by six pupilar parameters $x_O$, $y_O$, $z_O$, $\theta_{x0}$, $\theta_{y0}$, r which define the position, orientation and radius of the pupil 14, 24. These six pupilar parameters are common to the collection of pixel beams, when represented by a hyperboloid of one sheet, sharing a same pupil 14, 24. Indeed, a pixel beam represents the volume occupied by a set of rays of light in the object space of the optical system 11 sensed by the pixel 12 through the pupil 14, i.e. to a given couple pixel 12/pupil 14, 24 corresponds a unique pixel beam 10, 20, 30, but a plurality of distinct pixel beams can be supported by a same pupil 14, 24.

An origin O of a coordinate system (x,y,z) in which the parameters of the hyperboloid of one sheet representing the pixel beam 10, 20, 30 are defined corresponds to the centre of the pupil 14 as shown on FIG. 1, where the z axis defines a direction normal to the surface of the pupil 14, 24.

The parameters $\theta_x$, $\theta_y$, define chief ray directions relative to the entrance of the pupil 14 centre. They depend on the pixel 12 position on the sensor 13 and on the optical elements of the optical system 11. More precisely, the parameters $\theta_x$, $\theta_y$ represent shear angles defining a direction of the conjugate 15 of the pixel 12 from the centre of the pupil 14.

The parameter $z_P$ represents a distance of the waist 35 of the pixel beam 10, 20, 30, or the conjugate 15 of the pixel 12, along the z axis.

The parameter a represents the radius of the waist 35 of the pixel beam 10, 20, 30.

For optical systems 11 where optical distortions and field curvatures may be modelled, the parameters $z_P$ and a can depend on the parameters $\theta_x$ and $\theta_y$ via parametric functions.

The four independent parameters are related to the pixel 12 and its conjugate 15.

The six complementary pupilar parameters defining a pixel beam 10, 20, 30 are:
r which represents the pupil 14, 24 radius,
$x_O, y_O, z_O$ which represent the coordinates of the pupil 14, 24 centre in the (x,y,z) coordinate system, and
$\theta_{x0}, \theta_{y0}$ which represent the orientation of the pupil 14, 24 in the reference (x,y,z) coordinate system.

These six pupilar parameters are related to the pupil 14, 24. Another parameter c is defined. Such a parameter c is dependent on the parameters $z_P$ and a related to the pixel 12 and its conjugate 15 and on the parameters r related to the pupil 14, 24. The parameter c defines the angular aperture $\alpha$ of the pixel beam 10, 20, 30 and is given by the formula:

$$\tan(\alpha) = \frac{a}{c}.$$

Thus the expression of the parameter c is given by the following equation:

$$c^2 = \frac{a^2 z_P^2}{r^2 - a^2} \quad (1)$$

The coordinates (x,y,z), in the object space, of points belonging to the surface delimiting the pixel beam 10, 20, 30 are function of the above defined sets of parameters related to the pupil 14, and to the conjugate 15 of the pixel. Thus, equation (2) enabling the generation of the hyperboloid of one sheet representing the pixel beam 10, 20, 30 is:

$$\frac{(x - z \cdot \tan(\theta_x))^2}{a^2} + \frac{(y - z \cdot \tan(\theta_y))^2}{a^2} - \frac{(z - z_P)^2}{c^2} = 1 \quad (2)$$

A parametric equation (3) of the same hyperboloid representing the pixel beam 10, 20, 30 is:

$$\begin{cases} x = a\sqrt{1 + \frac{(z - z_P)^2}{c^2}} \cdot \cos(v) + z \cdot \tan(\theta_x) \\ y = a\sqrt{1 + \frac{(z - z_P)^2}{c^2}} \cdot \sin(v) + z \cdot \tan(\theta_y) \end{cases} \quad (3)$$

wherein v is an angle in the (x,y) plane enabling the generation of the pixel beam 10, 20, 30 from a generating hyperbola, v varies in [0, 2π] interval, and z ∈ [0, ∞] is the coordinate along the z axis which defines a direction normal to the surface of the pupil 14, 24. Equations (2) and (3) are written on the assumption that the section of the pixel 12 and its conjugate 15 are circular and that the section of the pupil 14, 24 is circular as well.

Information related to a correspondence between pixels of a sensor of said optical acquisition system and an object space of said optical acquisition system may take the form of either a set of parameters comprising the four independent parameters: $z_P, \theta_x, \theta_y$, a defining the position and size of the pixel conjugate 15, 35, in front of the pupil 14, 24 and the six pupilar parameters $x_O, y_O, z_O, \theta_{x0}, \theta_{y0}$, r which define the position, orientation and radius of the pupil 14, 24 when the pixel beam is to be represented by its parametric equation.

Thus, this set of parameters is provided in addition to raw images or epipolar images representing 4D light-field data captured by the optical acquisition system in order to be used while processing the 4D light-field data.

Figure 4:
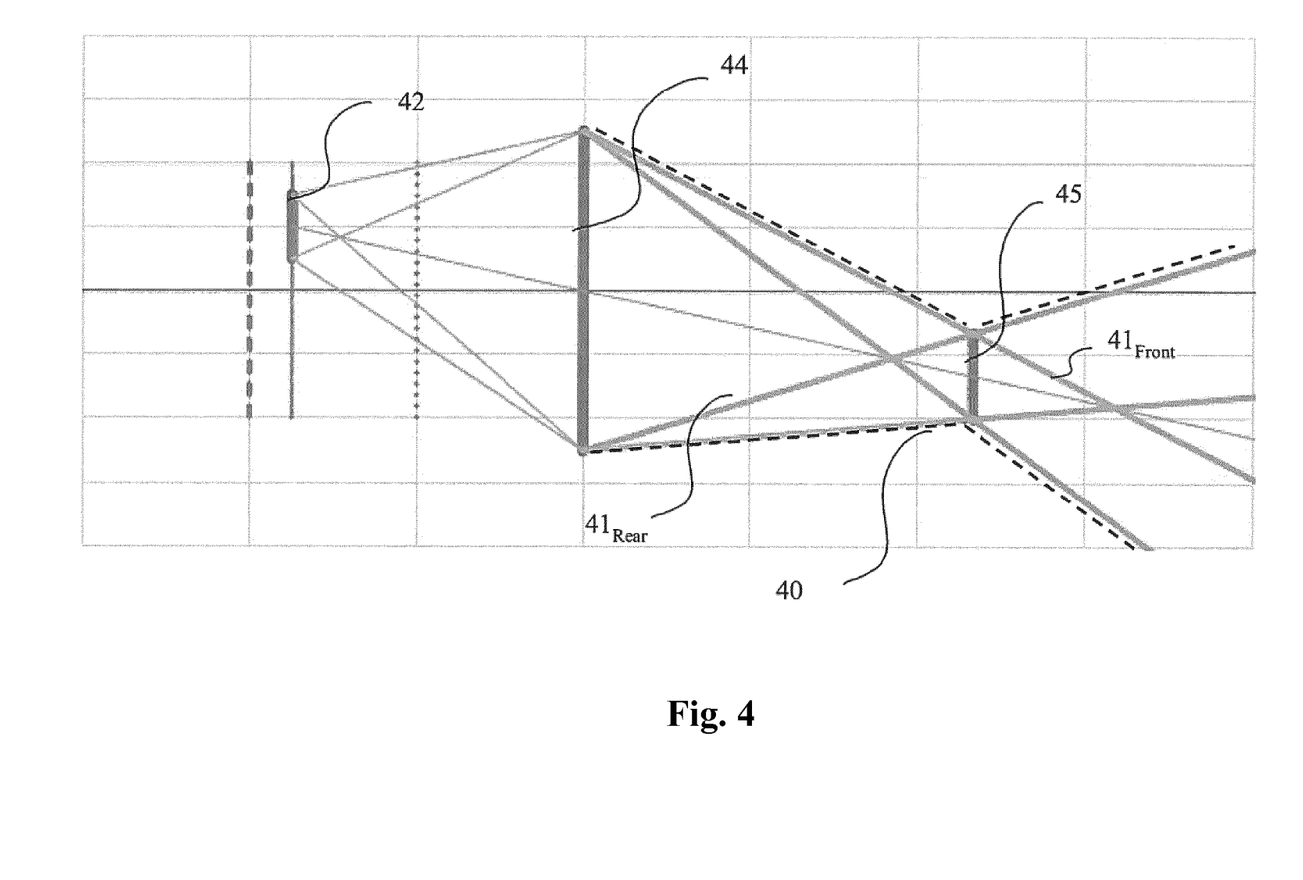
FIG. 4 shows a pixel beam represented by two coaxial, partially overlapping cones according to an embodiment of the invention.

In a second embodiment of the invention, a pixel beam 40 may be represented by two coaxial, partially overlapping cones a front cone $41_F$ and a rear cone $41_R$ as shown on FIG. 4, supported by two elements: the pupil 44 and the conjugate 45 of the pixel 42 in the object space, i.e. the surface in the object space that is imaged on the pixel.

The front cone $41_F$ is the image of a convex frustum defined by the pixel 42 and the pupil 44. The apex of the convex frustum lies beyond the sensor of the optical acquisition system. By construction, the front cone $41_F$ is converging in the object space of the optical acquisition system and the apex of the front cone $41_F$ lies between the conjugate of the pixel 45, or the waist of the pixel beam 40, and the pupil 44. The front cone $41_F$ derives from the solid angle subtended by the pupil 44 at the pixel 42.

The rear cone $41_R$ is the image of a cone defined by the pixel 42 and the pupil 44, the apex of which lies between the pupil 44 and the sensor of the optical acquisition system. By construction, the apex of the rear cone $41_R$ is located beyond the waist 45 of the pupil 40. The rear cone $41_R$ does not necessarily converge in the object space of the optical acquisition system, in some cases, it may degenerate into a cylinder or a diverging cone. In the latter case, the apex of the diverging cone lies in the image space of the optical acquisition system, i.e. before the entrance of the pupil 44.

The front cone $41_F$ and the rear cone $41_R$ share the same revolution axis, which is a line joining the centre of the pupil 44 and the centre of the waist 45.

Cones are ruled surfaces that can support the notion of pencil of rays of light and when combining two cones is compatible with the notion of "étendue" of physical light beams, notion linked to the preservation of energy across sections of the physical light beams. Intersections of cones with planes are conic curves, as for hyperboloids, which can be characterized by a plurality of coefficients. Considering its apex, a cone may be represented by three angular parameters: a polar angle measured from the revolution axis of the cone, up to the apex angle and the direction of the revolution axis given by two angles.

Let xyz be the coordinate system of the optical acquisition system, z denoting the optical axis of the optical acquisition system with z>0 in the object space of the optical acquisition system and the centre of the pupil 44 being the origin of said coordinate system.

The optics of the optical acquisition system images the object space of the optical acquisition system from the range z ∈ [2f; +∞] into the image space of the optical acquisition system z ∈ [−2f; −f], where f is the focal length of the optics of the optical acquisition system. The location of the pupil 44 and the waist 45 of the pixel beam 40 are known in the coordinate system xyz of the optical acquisition system from the calibration of the optical acquisition system. The pupil 44 and the waist 45 are assumed to be parallel and are both normal to the z axis.

Let us call z' the chief ray of the pixel beam 40. The chief ray is the line joining the centre of the pupil 44 and the centre of the waist 45 of the pixel beam 40. The chief ray is also the revolution axis and the axis of symmetry of the pixel beam 40. Thus, in the coordinate system xyz', the pixel beam 40 is a solid of revolution.

Both the apices of the front cone 41$_F$ and the rear cone 41$_R$ are located on the chief ray z' of the pixel beam 40. Under the thin lens approximation, the coordinates of these two apices are computed in the coordinate system xyz of the optical acquisition system as follow, under the assumption that the sensor of the optical acquisition system is not located the rear focal plane:

$$\begin{cases} \dfrac{z_w - z_{front}}{W} = \dfrac{z_{front} - z_P}{P} \\ \dfrac{z_{rear} - z_w}{W} = \dfrac{z_{front} - z_P}{P} \end{cases} \quad (4)$$

i.e.:

$$\begin{cases} z_{front} = \dfrac{P \cdot z_W + W \cdot z_P}{P + W} \\ z_{rear} = \dfrac{P \cdot z_W - W \cdot z_P}{P - W} \end{cases} \quad (5)$$

where P, $z_P$, W and $z_w$ respectively denote the diameter of the pupil 44 with P>0, its z-coordinate, the diameter of the pixel's conjugate 45 with 0<W<+∞, and its z-coordinate 0<$z_w$<+∞.

The z-coordinate $z_{rear}$ of the apex of the rear cone 41$_R$ may be positive, when the rear cone 41$_R$ is a converging cone, negative, when the rear cone 41$_R$ is a diverging cone. It may also be infinite if the pupil 44 and the pixel's conjugate 45 of the pixel beam are of the same size.

If the sensor of the optical acquisition system is located on the rear focal plane, then W=+∞ and $z_w$=+∞. As their ratio is a constant:

$$\dfrac{1}{z_{front} - z_P} = \dfrac{p}{P \cdot f} = \dfrac{1}{z_P - z_{rear}} \quad (6)$$

where p and f respectively represent the diameter of the pixel 42 with p>0 and the focal length of the optics of the optical acquisition system with f>0 assuming the optics of the optical acquisition system is a converging lens.

The apex angles are given by:

$$\begin{cases} \tan\theta_{front} = \dfrac{W/2}{|z_{front} - z_w|} \\ \tan\theta_{rear} = \dfrac{W/2}{|z_{rear} - z_w|} \end{cases} \quad (7)$$

Considering the apex of each cones, which union represents a pixel beam 40, rays can be defined with two angular parameters: the polar angle measure from the revolution axis of the pixel beam, up to the apex angle, and an azimuth in [0, 2π [.

Those information related to pixel beams are metadata associated to a given optical acquisition system. They may be provided as a data file stored for example on a CD-ROM or a flash drive supplied with the optical acquisition system. The data file containing the additional information related to pixel beams may also be downloaded from a server belonging to the manufacturer of the optical acquisition system. In an embodiment of the invention, these additional information related to pixel beams may also be embedded in a header of the images captured by the optical acquisition system.

The knowledge of these information related to pixel beams enables the processing of images captured by any optical acquisition system independently of the proprietary file format and of the features of the optical acquisition system used to capture the images to be processed.

The knowledge of information related to pixel beams enables the processing of images captured by any optical acquisition system independently of the proprietary file format and of the features of the optical acquisition system used to capture the images to be processed.

Figure 5:
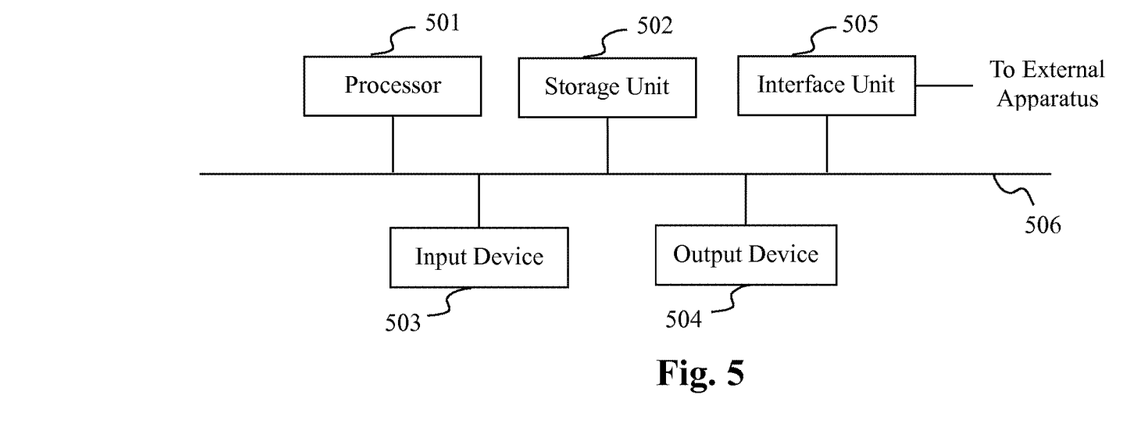
FIG. 5 is a schematic block diagram illustrating an example of an apparatus for generating data representative of pixel beams according to an embodiment of the invention.

FIG. 5 is a schematic block diagram illustrating an example of an apparatus for generating data representative of pixel beams according to an embodiment of the present disclosure.

The apparatus 500 comprises a processor 501, a storage unit 502, an input device 503, a display device 504, and an interface unit 505 which are connected by a bus 506. Of course, constituent elements of the computer apparatus 500 may be connected by a connection other than a bus connection.

The processor 501 controls operations of the apparatus 500. The storage unit 502 stores at least one program capable of generating data representative of pixel beams representing the object space of a first optical system when these pixel beams are imaged through a second optical system to be executed by the processor 501, and various data, including parameters related to a position of the pixel 12 on the sensor 13 or parameters related to the first optical system 11 of the optical acquisition system and a second optical system, parameters used by computations performed by the processor 501, intermediate data of computations performed by the processor 501, and so on. The processor 501 may be formed by any known and suitable hardware, or software, or a combination of hardware and software. For example, the processor 501 may be formed by dedicated hardware such as a processing circuit, or by a programmable processing unit such as a CPU (Central Processing Unit) that executes a program stored in a memory thereof.

The storage unit 502 may be formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for computing data representative of the pixel beams of a collection of pixel beams according to an embodiment of the present disclosure as described hereinafter with reference to FIG. 6.

The input device 503 may be formed by a keyboard, a pointing device such as a mouse, or the like for use by the user to input commands, to make user's selections of parameters used for generating a parametric representation of a volume occupied by a set of rays of light in an object space of an optical system. The output device 604 may be formed by a display device to display, for example, a Graphical User Interface (GUI), images generated according to an embodiment of the present disclosure. The input device 503 and the output device 504 may be formed integrally by a touch-screen panel, for example.

The interface unit 505 provides an interface between the apparatus 500 and an external apparatus. The interface unit 505 may be communicable with the external apparatus via cable or wireless communication. In an embodiment, the external apparatus may be an optical acquisition system such as an actual camera.

Figure 6:
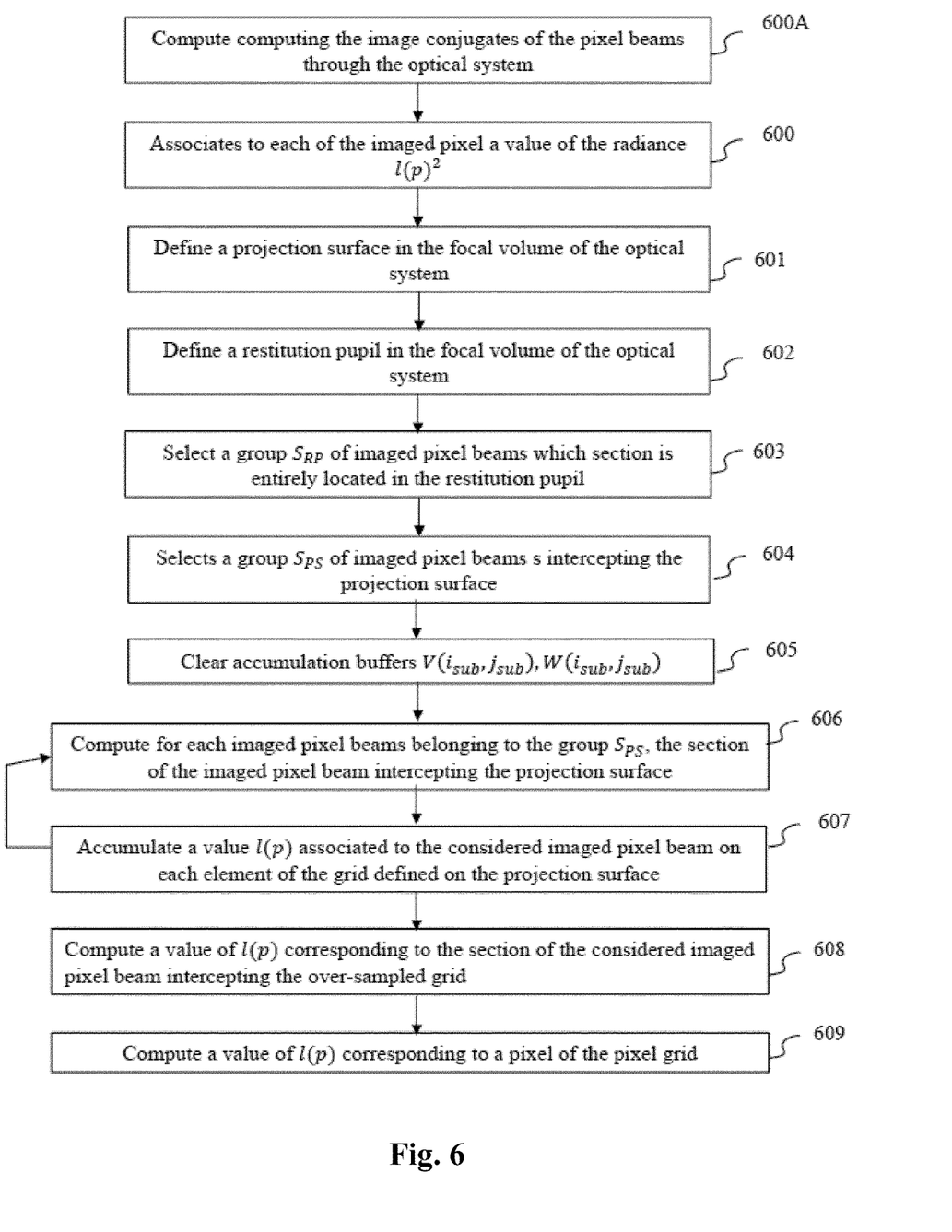
FIG. 6 is a flow chart for explaining a process for encoding an image captured by the optical acquisition system according to an embodiment of the disclosure.

FIG. 6 is a flow chart for explaining a process generating data representative of a pixel beam according to an embodiment of the invention.

Figure 7:
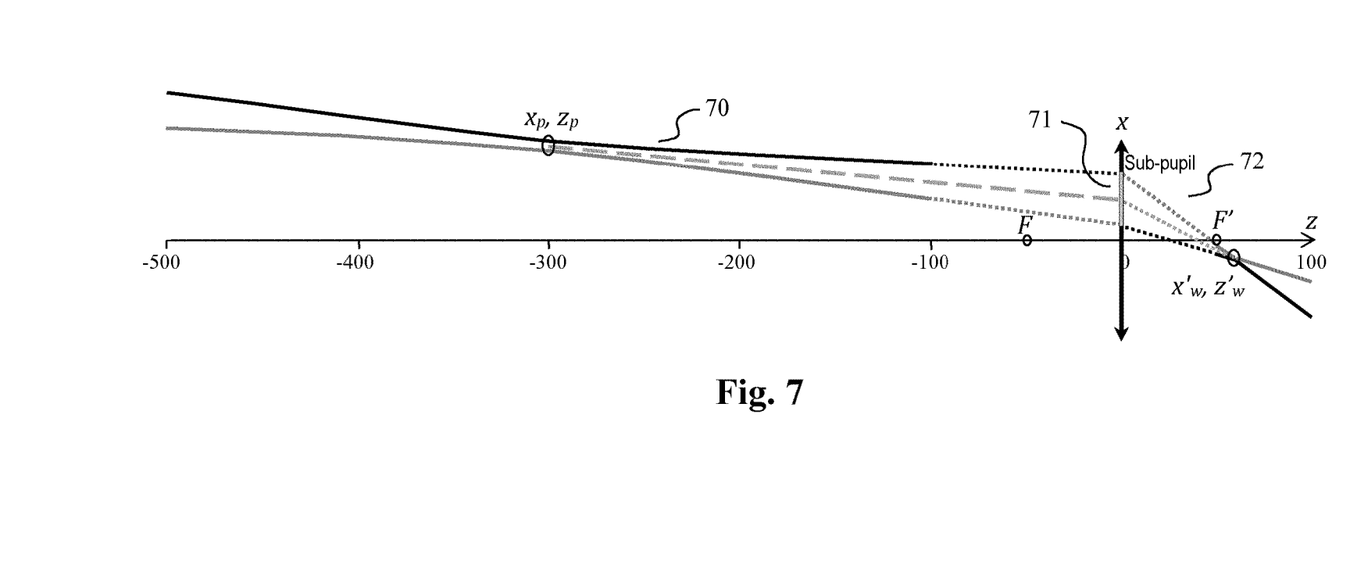
FIG. 7 represents a pixel beam and the conjugate of said pixel beam through a second optical system according to an embodiment of the invention, FIG. 8 a projection surface and a restitution pupil used in the method according to an embodiment of the invention.

The processor 501 of the apparatus 500 executes a step 600A of computing data representative of at least one pixel beam 70 of a collection of pixel beams representative of the object space of a first optical system (not shown on the figure) from a conjugate 72 of said pixel beam 70 through a second optical system 71 as represented on FIG. 7. In the following example, the pixel beams 70, 72 are represented by a hyperboloid of one sheet 20.

Thus, the processor 501 computes a conjugate 72 of the pixel beam 70 through the optical system 71, which is for example a thin lens, to provide data representative of the pixel beam 70 in the focal volume of the optical system 71.

The conjugate 72 of the pixel beam 70 through the optical system 71 may be computed as explained hereafter.

As described in reference to FIGS. 1 to 3, a pixel beam linked to a pupil of an optical system is defined by six extrinsic parameters:
  r: the entrance pupil radius of the first optical system,
  $x_O, y_O, z_O$: the coordinates of the entrance pupil centre of the first optical system in a reference coordinate system, and
  $\theta_{xO}, \theta_{yO}$: an orientation of the entrance pupil of the first optical system in the reference coordinate system.

In the reference coordinate system, and keeping $\theta_{x0}=\theta_{y0}=0$ for simplicity, a parametric equation of the hyperboloid representing the pixel beam is given by:

$$\frac{(x - x_O - (z - z_0) \cdot \tan(\theta_x))^2}{a^2} + \frac{(y - y_O - (z - z_0) \cdot \tan(\theta_y))^2}{a^2} - \frac{(z - z_O - z_P - z_O)^2}{c^2} = 1 \quad (8)$$

or equivalently:

$$\begin{cases} x = x_O + a\sqrt{1 + \frac{(z-z_P)^2}{c^2}} \cdot \cos(v) + (z - z_0) \cdot \tan(\theta_x) \\ y = y_O + a\sqrt{1 + \frac{(z-z_P)^2}{c^2}} \cdot \sin(v) + (z - z_0) \cdot \tan(\theta_y) \end{cases} \quad (9)$$

In an embodiment of the invention, a value representing a colour, such as a RGB value, acquired by a pixel of the sensor of the first optical acquisition system is associated to the corresponding pixel beam 70.

The parameters defining a plane surface representing the second optical system 71 are either defined when the second optical system 71 is a virtual optical system or retrieved when the second optical system is an actual optical system:
  coordinates of the optical centre of the second optical system 71 are $x_C, y_C, z_C$
  coordinates of a unit vector normal to the surface of the optical system 71: $\theta_{xC}, \theta_{yC}$
  a focal f of the optical system 71.
  In order to simplify explanations, the optical centre of the second optical system 71 is taken in the same plane as the pupil centre of the first optical system: $z_C=z_O$ and the optical system 71 is supposed to be parallel to the pupil, i.e. $\theta_{xC}=\theta_{yC}=0$.

The coordinates of a point M relative to the optical system 71 center C are denoted: x, y, z. The coordinates of the image M' of point M through the optical system 71, are denoted: x', y', z'. Each of these coordinates are algebraic values.

The coordinates of point M' are computed using the Newton's form of "the Lens Maker formula" which is:

$$(|z|-f)(|z'|-f)=f^2 \quad (10)$$

Since point M is located before the optical system 71, i.e. z<0 and point M' is located after the optical system 71, i.e. z'>0, then:

$$(-z-f)(z'-f)=f^2 \quad (11)$$

which gives $$z' = f - \frac{f^2}{z+f} = \frac{f \cdot z}{z+f} \quad (12)$$

When the optical system 71 is a thin lens, as the ray of light passing through its optical centre is not deviated magnification is given by:

$$m = \frac{x'}{x} = \frac{y'}{y} = \frac{z'}{z}$$

which gives:

$$\begin{cases} z' = \frac{f \cdot z}{f + z} \\ x' = x\frac{z'}{z} \\ y' = y\frac{z'}{z} \end{cases} \quad (13)$$

and conversely:

$$\begin{cases} z' = \frac{f \cdot z}{f + z} \\ x' = x\frac{z'}{z} \\ y' = y\frac{z'}{z} \end{cases} \quad (15)$$

When M is a point belonging to the surface of a pixel beam 70 the coordinates of point M' situated on the surface of the imaged pixel beam are:

$$\begin{cases} z = \frac{f \cdot z'}{f - z'} \\ x = x'\frac{z}{z'} \\ y = y'\frac{z}{z'} \end{cases} \quad (14)$$

As a paraxial lens transforms rays of light (straight lines) in object space into rays of light in image space, and as pixel beams 70 are represented by a ruled surface, the imaged pixel beams 72 are also represented by a ruled surface, as the image of an hyperboloid of one sheet in object space is an hyperboloid of one sheet in image space.

Let's determine the parameters of the hyperboloid representing the imaged pixel beam 72 from the parameters of the hyperboloid representing the pixel beam 70 and from the parameters of the optical system 71.

Considering the following equation:

$$\begin{cases} x = x_O + a\sqrt{1 + \frac{(z-z_P)^2}{c^2}} \cdot \cos(v) + (z-z_0) \cdot \tan(\theta_x) \\ y = y_O + a\sqrt{1 + \frac{(z-z_P)^2}{c^2}} \cdot \sin(v) + (z-z_0) \cdot \tan(\theta_y) \end{cases} \quad (9)$$

representing the pixel beam 70 where $\theta_x = \theta_y = 0$, $x_0 = y_0 = z_0 = 0$ and $v=0$ in order to reduce the analysis to a pixel beam on axis, and to the x, z plane.

The parameters to be determined are then $z'_W$, $a'$ which are a function of $z_P$, a, f, r, where $z'_W$ is the z coordinate of the waist of the imaged pixel beam 72 (W' is not the conjugate point of P through the imaging process due to beam aperture—$a \neq 0$) and a' is the radius of the waist of the imaged pixel beam 72.

With the assumption that $\theta_x = \theta_y = 0$, $x_0 = y_0 = z_0 = 0$ and $v=0$ the equation 16 applied to point M simplifies to:

$$\begin{cases} x = a\sqrt{1 + \frac{(z-z_P)^2}{c^2}} \\ y = 0 \end{cases} \quad (16)$$

Using the paraxial lens transform of equation 14 for M we get:

$$x'\frac{z}{z'} = a\sqrt{1 + \frac{\left(\frac{f \cdot z'}{z-f'} - z_P\right)^2}{c^2}} \quad (17)$$

$$\Leftrightarrow \frac{x'^2}{a^2} = \left(\frac{f-z'}{f}\right)^2 \left(1 + \frac{\left(\frac{f \cdot z'}{f-z'} - z_P\right)^2}{c^2}\right) \quad (18)$$

$$\Leftrightarrow \frac{x'^2}{a^2} = \left(\frac{f-z'}{f^2}\right)^2 + \frac{((f+z_P) \cdot z' - f \cdot z_P)^2}{f^2 c^2} \quad (19)$$

$$\Leftrightarrow \frac{f^2 c^2}{a^2} x'^2 = c^2(f-z')^2 + ((f+z_P) \cdot z' - f \cdot z_P)^2 \quad (20)$$

which is the equation representing the imaged pixel beam 72 in the focal volume of the optical system 71.

Deriving e equation (20) enables the calculation of the minima and/or maxima of the hyperbolas representing the pixel beams by finding the zero crossing of the derivative.

Equation (20) when developed gives:

$$\frac{f^2 c^2}{a^2} x'^2 = ((f+z_P)^2 + c^2) \cdot z'^2 - 2f(z_P(f+z_P) + c^2) \cdot z' + f^2(z_P^2 + c^2) \quad (21)$$

The derivative of equation (21) is given by:

$$\frac{d}{dz'}\left(\frac{f^2 c^2}{a^2} x'^2\right) = \quad (22)$$
$$\frac{d}{dz'}(((f+z_P)^2 + c^2)z'^2 - 2f(z_P(f+z_P) + c^2) \cdot z' + f^2(z_P^2 + c^2))$$

$$\Leftrightarrow \frac{d}{dz'}\left(\frac{f^2 c^2}{a^2} x'^2\right) = 2((f+z_P)^2 + c^2)z' - 2f(z_P(f+z_P)c^2) \quad (23)$$

Computing the zero crossing gives of the derivative (23):

$$\frac{d}{dz'}\left(\frac{f^2 c^2}{a^2} x'^2\right) = 0 \Leftrightarrow z'_W = \frac{f(z_P(f+z_P) + c^2)}{(f+z_P)^2 + c^2} \quad (24)$$

$$\Leftrightarrow z'_W = f\left(1 - \frac{f(f+z_P)}{(f+z_P)^2 + c^2}\right) \quad (25)$$

Knowing that $$c^2 = \frac{a^2 z_P^2}{r^2 - a^2}$$

each term of $$z'_W = f\left(1 - \frac{f(f+z_P)}{(f+z_P)^2 + \frac{a^2 z_P^2}{r^2 - a^2}}\right)$$

can be divided by $z_P^2$. Thus, if $z_P \gg f$ and $(f+z_P) \approx z_P$ an approximation can be derived:

$$\widetilde{z'_W} = f\left(1 - \frac{f}{z_P}\left(1 - \frac{a^2}{r^2}\right)\right)$$

(26) Since a' is the radius of the wait of the imaged pixel beam 72, it is also the minimum value of the positive hyperbola for the imaged pixel beam 72 i.e. it corresponds to the value of x' as defined by equation 20 for $z'=z'_W$:

$$a' = x'(z'_W) \quad (27)$$

This gives:

$$\frac{f^2 c^2}{a^2} a'^2 = c^2(f - z'_W)^2 + ((f+z_P) \cdot z'_W - f \cdot z_P)^2 \quad (28)$$

$$\Leftrightarrow a' = \frac{a}{f}\sqrt{(f-z'_W)^2 + \frac{((f+z_P) \cdot z'_W - f \cdot z_P)^2}{c^2}} \quad (29)$$

$$\Leftrightarrow a' = \frac{a}{f}\sqrt{(f-z'_W)^2 + \frac{r^2 - a^2}{a^2}\left(\frac{f+z_P}{z_P} \cdot z'_W - f\right)^2} \quad (30)$$

Let's consider a point x, y and its conjugate x', y' through the optical system 71. For a ray of light passing by point x, y and the optical system 71 centre, the laws of optics give:

$$\frac{x}{z} = \frac{x'}{z'}. \quad (31)$$

If the ray of light is a ray of incidence $\theta_x$ when hitting the optical system 71 at height $x_0$ then:

$$\tan\theta_x = \frac{x - x_0}{z} = \frac{x}{z} - \frac{x_0}{z} \quad (32)$$

and similarly:

$$\tan\theta'_x = \frac{x'}{z'} - \frac{x_0}{z'} \quad (33)$$

Thus:

$$\tan\theta'_x = \tan\theta_x + \frac{x_0}{z} - \frac{x_0}{z'} = \tan\theta_x + x_0\left(\frac{1}{z} - \frac{1}{z'}\right) \quad (34)$$

As known from the lens maker formula:

$$\frac{1}{z'} = \frac{1}{z} + \frac{1}{f}$$

we obtain:

$$\tan\theta'_x = \tan\theta_x - \frac{x_0}{f} \quad (35)$$

And similarly:

$$\tan\theta'_y = \tan\theta_y - \frac{y_0}{f} \quad (36)$$

Consequently, the equation representing the imaged pixel beam 72 is:

$$\begin{cases} x = x_0 + a'\sqrt{1 + \frac{(z - z'_W)^2}{c^2}} \cdot \cos(v) + (z - z_0) \cdot \tan(\theta'_x) \\ y = y_0 + a'\sqrt{1 + \frac{(z - z'_W)^2}{c^2}} \cdot \sin(v) + (z - z_0) \cdot \tan(\theta'_y) \end{cases} \quad (37)$$

with parameters: $z'_w$, $\theta'_x$, $\theta'_y$, $a'$ obtained from the parameters $z_P$, $\theta_x$, $\theta_y$, $a$ of the pixel beam 70 by:

$$\begin{cases} z'_W = f\left(1 - \frac{f(f + z_P)}{(f + z_P)^2 + c^2}\right) \\ a' = \frac{a}{f}\sqrt{(f - z'_W)^2 + \frac{((f + z_P) \cdot z'_W - f \cdot z_P)^2}{c^2}} \\ \tan\theta'_x = \tan\theta_x - \frac{x_0}{f} \\ \tan\theta'_y = \tan\theta_y - \frac{y_0}{f} \end{cases} \quad (38)$$

with $c^2 = \frac{a^2 z_P^2}{r^2 - a^2}$

In a step 600, the processor 501 of the apparatus 500 associates to each of the imaged pixel beams 72 of a collection of imaged pixel beams a value of the radiance, denoted $l(p)^2$, propagating in the pixel imaged pixel beam 72 toward the second optical system 71. The value of the radiance is for example given using RGB values.

The collection of imaged pixel beams 72 is obtained either by computing the conjugates 72 of the pixel beams 70 through the optical system 71 as explained in the previous step 600A or a collection of pixel beams already imaged is provided from an external source to the apparatus 500.

Figure 8:
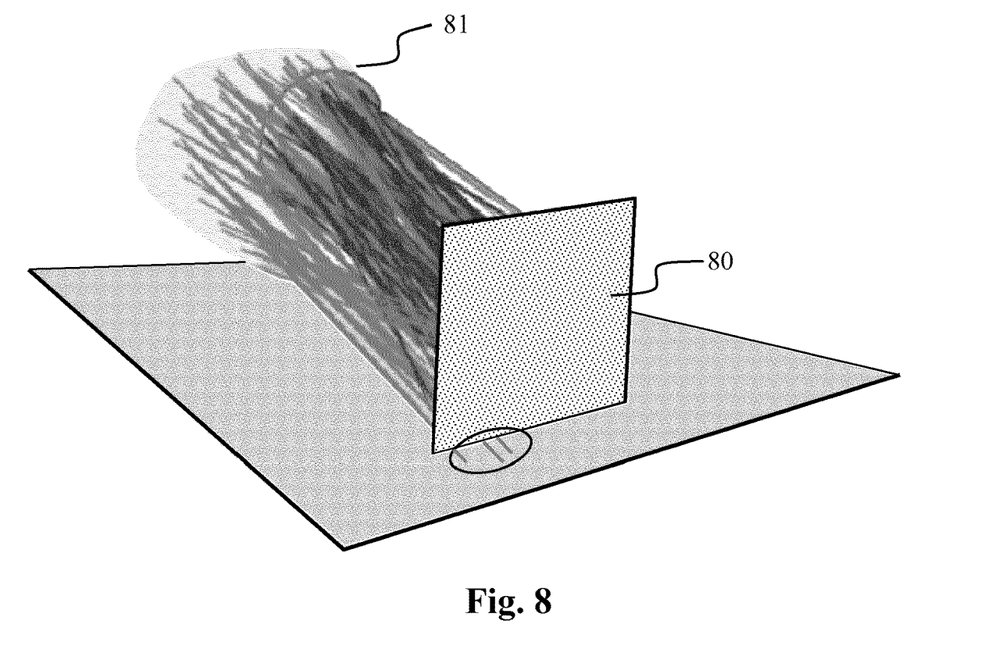

In a step 601, a projection surface 80, represented on FIG. 8, is defined in the focal volume of the second optical system 71. Such a projection surface is equivalent to a virtual sensor for example.

Such a projection surface 80 is for example of rectangular shape and is orthogonal to and centered on the optical axis of the second optical system 71. It crosses the optical axis of the second optical system 71 at a distance D from the second optical system 71.

In a step 603, the processor 501 of the apparatus 500 defines at least one grid on the projection surface 80.

In an embodiment of the invention, the grid defined on the projection surface 80 is a pixel grid.

Figure 9:
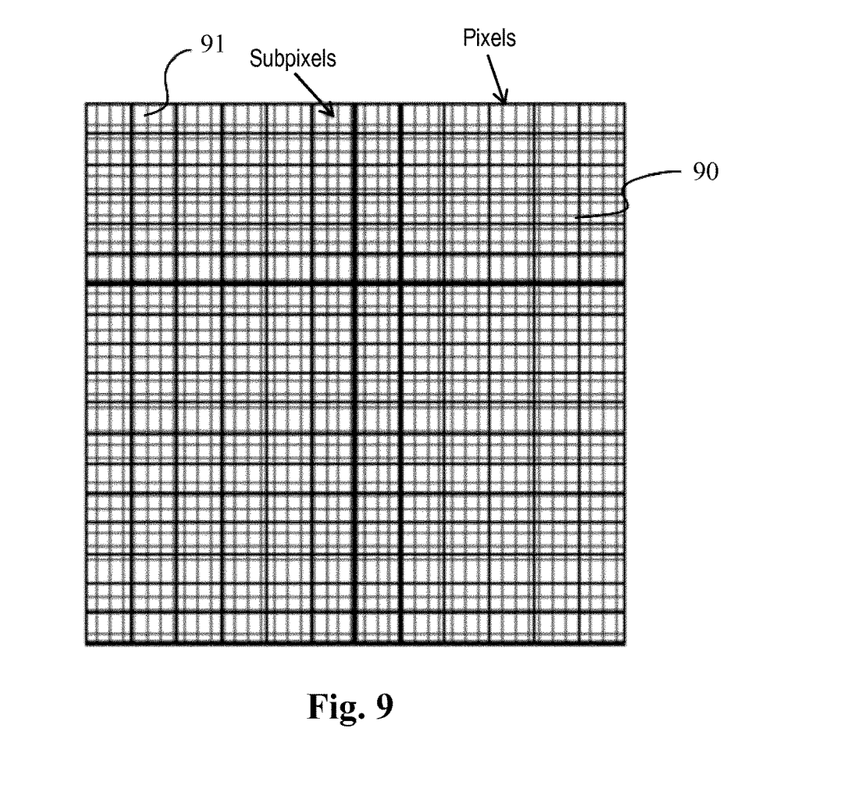
FIG. 9 represents a pixel grid and an over-sampled grid defined on the restitution surface.

In another embodiment of the invention, two grids are defined on the projection surface 80, as represented on FIG. 9, a pixel grid 90 and an over-sampled grid 91 comprising a plurality of subpixel elements.

The pixels of the pixel grids have two coordinates (i,j) on the projection surface 80 and extensions in two directions di,dj, where $i \in [0, i_{max}]$, $j \in [0, j_{max}]$, and $(x, y, dx, dy)_{i,j} = \text{Rect}(i,j)$ and Rect(i,j) is by default a function defined to compute a rectangular area of position x, y and of size dx,dy on the projections surface 80.

For an optimal rendering compared to available pixel beam information, dx,dy may be defined by half of the smallest overlap between pixel beams sections on the projection surface 80, which corresponds the Shannon criterion. For cases requiring a higher resolution in terms of point in focus on the projection surface 80, the smallest information samples are of the size of the smallest overlap between pixel beam sections. A statistical estimation can be used to define dx and dy.

The subpixel elements of the over-sampled grid 91 are m×n times smaller than the pixels of the pixel grid 90, i.e.

$$\frac{dx}{m}, \frac{dy}{n}.$$

In a step 602, a restitution pupil 81, represented on FIG. 8, is defined on the second optical system 71.

The restitution pupil 81 is, for example, of circular shape, with a radius $r_{RP}$. The position of the restitution pupil 81 relatively to the optical system 71 is given by the coordinates of its centre $(x_{RP}, y_{RP})$.

In a step 603, the processor 501 selects a first group $S_{RP}$ of imaged pixel beams 72 from the collection of imaged pixel beams. The selected imaged pixel beams $S_{RP}$ are imaged pixels beams which section is entirely located in the restitution pupil 81. This step 603 is optional and might not be executed in certain embodiments of the invention.

In a step 604, the processor 501 selects a second group $S_{PS}$ of imaged pixel beams 72 from the collection of imaged pixel beams. The selected imaged pixel beams $S_{PS}$ are imaged pixels beams intercepting the projection surface 80.

This step 604 is optional and might not be executed in certain embodiments of the invention.

In another embodiment of the invention, the second group $S_{PS}$ of imaged pixel beams is selected from the first group $S_{RP}$ of imaged pixel beams. Thus the second group $S_{PS}$ of imaged pixel beams corresponds to imaged pixel beams 72 having both their section entirely located in the restitution pupil 81 and intercepting the projection surface 80.

In a step 605, two accumulation buffers $V(i_{sub},j_{sub})$, $W(i_{sub},j_{sub})$ located in the apparatus 500 are cleared.

In a step 606, for each imaged pixel beams belonging to the second group $S_{PS}$, the section of the imaged pixel beam intercepting the projection surface 80 is computed by the processor 501. Such a section is for example a circle, an ellipse or a rectangle, etc.

Then, in a step 607, the value l(p) associated to the considered imaged pixel beam is accumulated on each element of the grid defined on the projection surface 80. Thus, for example, the value l(p) associated to the considered imaged pixel beam is accumulated on each subpixel element of the over-sampled grid 91 intercepted by the section of the considered imaged pixel beam.

Accumulation consists in summing in a subpixel value register v embedded in the apparatus 500 the values l(p) for the considered subpixel element of the over-sampled grid 91 and in summing in a weight register w embedded in the apparatus 500 a hit. The value of the hit may 1 or 0 if an image corresponds to a flat image. In case the radiance acquired on a uniform 'white' source image, is not uniform, for example due to vignetting, the weight w has a value between 0 and 1 which corresponds to the acquisition of a uniform 'white' source image:

$$v(i_{sub},j_{sub}) = \Sigma_{p \in S_{PS}} l(p)$$

$$w(i_{sub},j_{sub}) = \Sigma_{p \in S_{PS}} 1$$

The steps 606 and 607 are executed for each pixel beams of the second group $S_{PS}$.

In a step 608, the value of l(p) corresponding to the section of the considered imaged pixel beam intercepting the over-sampled grid 91 is computed by the processor 501. Such a value is given by:

$$L(i_{sub}, j_{sub}) = \frac{v(i_{sub}, j_{sub})}{w(i_{sub}, j_{sub})}.$$

In a step 609, the value of l(p) corresponding to a pixel of the pixel grid 90 is computed by the processor 501. Such a value L(i,j) is obtained by scaling down the values $L(i_{sub}, j_{sub})$ associated to subpixels elements belonging to a same pixel of the pixel grid 90 by scaling the factor m×n using a method such as box scaling, summing subsamples or by another scaling algorithm.

This method enables the computation of a single image in a focal volume of a known optical system as a function of the distance D between a projection surface 80 and the optical system, the radius $r_{RP}$ and the coordinates of the centre $(x_{RP},y_{RP})$ of a restitution pupil 81.

Computing several images with different values of D and of the radius $r_{RP}$ of the restitution pupil 81 provides a focal stack.

Computing several focal stacks with different values of coordinates of the centre $(x_{RP},y_{RP})$ of the restitution pupil 81 provides a matrix focal stacks.

The method according to the different embodiments of the invention enables the mixing of light-field data acquired by different type of light-field acquisition system, may they be acquired from a tangible acquisition system or Computer Graphics Image (CGI) data that are totally or partially simulated by a computer for a given scene description.

Figure 10:
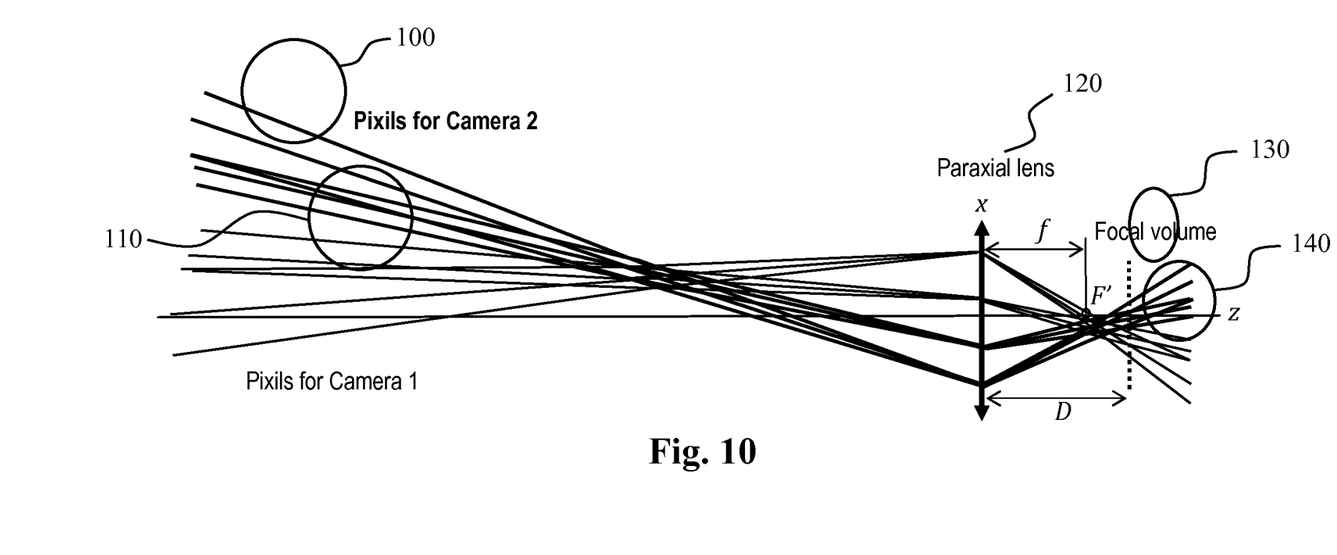
FIG. 10 represents two collections of pixel beams representing the object spaces of two light-field acquisition systems, FIG. 11 a flowchart of a mixing method according to an embodiment of the invention.

FIG. 10 represents two collections of pixel beams 100 and 110 representing the object spaces of two light-field acquisition systems (not represented on the figure). The conjugates of the pixel beams of the two collections 100 and 110 are imaged through a common an optical system 120 according the method described in reference to FIG. 6. Thus two collections of imaged pixel beams 130 and 140 are obtained.

In a first embodiment of the invention, in order to account for imprecise calibration and positioning of the light-field acquisition systems which light-field data are intended to be mixed, a different set of parameters representing the optical system 120 is provided to compute the conjugate of the pixel beams of each collection of pixel beams 100 and 110.

That is too say that the conjugates of the pixel beams of a first collection of pixel beams 100 are computed using a first set of parameters representing the optical system 120 and the conjugates of the pixel beams of a second collection of pixel beams 110 are computed using a first set of parameters representing the optical system 120.

The parameters of the optical system 120 are defined in the object space where the pixel beams of a given collection of pixel beams are defined. The optical system 120 is defined by:

the location of its optical centre $x_C$, $y_C$, $z_C$,
a unit vector $\theta_{xC}$, $\theta_{yC}$,
its focal distance f.

Adjusting these parameters for each pixel beams collections 100, 110 allows positioning and scaling of the conjugates of the pixel beams of these respective collections. It also enable the adjustment of the two collections of imaged pixel beams 130 and 140 with regard to one another before the mixing operation and the generation of the images according the method described in reference to FIG. 6.

In a second embodiment of the invention, intrinsic parameters of a light-field acquisition system and extrinsic parameters of a light-field acquisition system are taken into account when computing the conjugates of pixel beams through the optical system 120.

Intrinsic parameters of a light-field acquisition system link the coordinate system of the pixels of the sensor to the coordinate system of the light-field acquisition system. These intrinsic parameters are for example: $z_P$, $\theta_x$, $\theta_y$, a which define the position and size of the pixel conjugate in front of a pupil of the optical system 120 and six pupilar parameters $x_O$, $y_O$, $z_O$, $\theta_{xO}$, $\theta_{yO}$, r which define the position, orientation and radius of the pupil. These six pupilar parameters are common to the collection of pixel beams, when represented by a hyperboloid of one sheet.

Extrinsic parameters of a light-field acquisition system link the coordinate system of the light-field acquisition system to the world coordinate system and define the location and the orientation of the light-field acquisition system.

For each light-field acquisition system $C_i$ a function transforming a point $P_W$ in the world coordinate system to its image $P_{C_i}$ in the coordinate system of the light-field acquisition system. Such a function is for example a combination of a translation and a rotation. In this case: $P_{C_i} = R_{C_i}(P_W - T_{C_i})$, where $R_{C_i}$ is a rotation matrix and $T_{C_i}$ is a translation vector both associated to the light-field acquisition system $C_i$. In some embodiment of the invention, the coordinate system of the light-field acquisition system and the world coordinate system are the same. In this case, the rotation matrix $R_{C_i}$ is the identity matrix I and the translation vector $T_{C_i}$ is the null vector.

Figure 11:
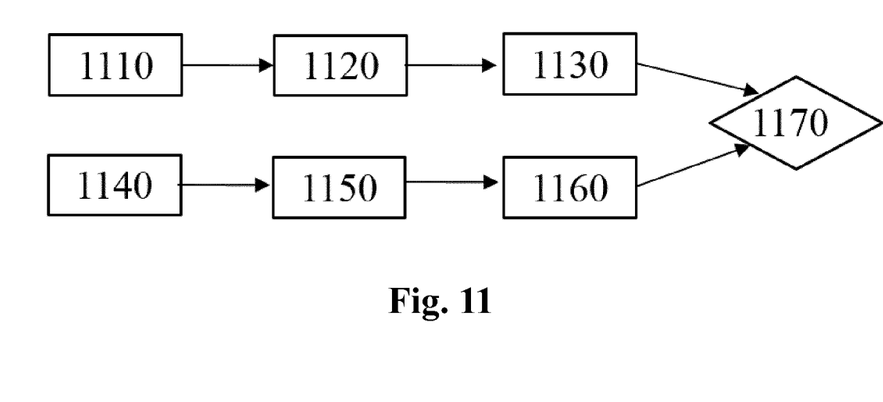

FIG. 11 represents a flowchart of the second embodiment of the invention.

In a step 1110, a first adjustment of the pixel beams of the first collection 100 of pixel beams is computed using the set of intrinsic parameters of the light-field acquisition system used to acquire the first collection of pixel beams 100. The result of this step 1110 is a first adjusted collection of pixel beams.

In a step 1120, a second adjustment of the first adjusted collections of pixel beams is computed using the set of extrinsic parameters of the light-field acquisition system used to acquire the first collection of pixel beams 100. The result of this step 1120 is a second adjusted collection of pixel beams.

In a step 1130, the conjugates of the pixel beams of the second adjusted collection are computed according the method described in reference to FIG. 6. The result of this step 1130 is a first collection of imaged pixel beams.

In a step 1140, a first adjustment of the pixel beams of the first collection 110 of pixel beams is computed using the set of intrinsic parameters of the light-field acquisition system used to acquire the first collection of pixel beams 110. The result of this step 1140 is a fourth adjusted collection of pixel beams.

In a step 1150, a second adjustment of the fourth adjusted collections of pixel beams is computed using the set of extrinsic parameters of the light-field acquisition system used to acquire the first collection of pixel beams 110. The result of this step 1150 is a fifth adjusted collection of pixel beams.

In a step 1160, the conjugates of the pixel beams of the fifth adjusted collection are computed according the method described in reference to FIG. 6. The result of this step 1150 is a second collection of imaged pixel beams.

In a step 1170, the first collection of imaged pixel beams and the second collection of imaged pixel beams are mixed into a single image.

During steps 1120 and 1150, some creative editing may be performed while performing the second adjustment using the extrinsic parameters. It may also be the case during the mixing step 1170.

Such a method enables to perform special visual effects at the light-field level.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method comprising:
    receiving a first content captured by a first acquisition device comprising a plurality of pixels and having a first optical system, wherein the first content includes a first set of pixel beams each having at least one first associated parameter;
    receiving a second content captured by a second acquisition device comprising a plurality of pixels and having a second optical system, wherein the second content includes a second set of pixel beams each having at least one second associated parameter;
    wherein a pixel beam is a volume occupied by a set of light rays emitted in an object space of an optical system, the light rays passing through a pupil of the optical system and a conjugate of the pixel;
    determining a projection surface as a virtual sensor having grid elements and an associated non-physical optical system, wherein the projection surface is located in an image space of the non-physical optical system;
    computing the first set of pixel beams using intrinsic and extrinsic parameters of the first acquisition device and the projection surface to determine a first set of imaged pixel beams represented by conjugates of the first set of pixel beams in the non-physical optical system, wherein the first set of imaged pixel beams are imaged pixels beams which section is entirely located in a restitution pupil defined in the non-physical optical system;
    computing the second set of pixel beams using intrinsic and extrinsic parameters of the second acquisition device and the projection surface to determine a second set of imaged pixel beams represented by conjugates of the second set of pixel beams in the non-physical optical system, wherein the second set of imaged pixel beams are imaged pixels beams which section is entirely located in the restitution pupil defined in the non-physical optical system;
    wherein the first set of pixel beams and the second set of pixel beams are mixed together and form a unique set of pixel beams;
    determining an intersection of the imaged pixel beams from the first and second sets of imaged pixel beams with the projection surface;
    accumulating values of parameters associated with the imaged pixel beams from the first and second sets of imaged pixel beams based on an intersection of the imaged pixel beams with the grid elements on the projection surface, wherein the values of the parameters comprise at least one of radiance or color; and
    generating an image of pixel values based on the accumulated values of the parameters.

2. The method of claim 1, wherein the at least one first associated parameter is obtained by at least a sensor of the first acquisition device.

3. The method of claim 1, wherein the first set of pixel beams are comprised of volumetric rays.

4. The method of claim 1, wherein the non-physical optical system is a different optical system than the first optical system.

5. An apparatus comprising a processor configured to:
    receive a first content captured by a first acquisition device comprising a plurality of pixels and having a first optical system, wherein the first content includes a first set of pixel beams each having at least one first associated parameter;
    receive a second content captured by a second acquisition device comprising a plurality of pixels and having a second optical system, wherein the second content includes a second set of pixel beams each having at least one second associated parameter;
    wherein a pixel beam is a volume occupied by a set of light rays emitted in an object space of an optical system, the light rays passing through a pupil of the optical system and a conjugate of the pixel;

determine a projection surface as a virtual sensor having grid elements and an associated non-physical optical system, wherein the projection surface is located in an image space of the non-physical optical system;

compute the first set of pixel beams using intrinsic and extrinsic parameters of the first acquisition device and the projection surface to determine a first set of imaged pixel beams represented by conjugates of the first set of pixel beams in the non-physical optical system, wherein the first set of imaged pixel beams are imaged pixels beams which section is entirely located in a restitution pupil defined in the non-physical optical system;

compute the second set of pixel beams using intrinsic and extrinsic parameters of the second acquisition device and the projection surface to determine a second set of imaged pixel beams represented by conjugates of the second set of pixel beams in the non-physical optical system, wherein the second set of imaged pixel beams are imaged pixels beams which section is entirely located in the restitution pupil defined in the non-physical optical system;

wherein the first set of pixel beams and the second set of pixel beams are mixed together and form a unique set of pixel beams;

determine an intersection of the imaged pixel beams from the first and second sets of imaged pixel beams with the projection surface;

accumulate values of parameters associated with the imaged pixel beams from the first and second sets of imaged pixel beams based on an intersection of the imaged pixel beams with the grid elements on the projection surface, wherein the values of the parameters comprise at least one of radiance or color; and generate an image of pixel values based on the accumulated values of the parameters.

6. The apparatus of claim 5, wherein the at least one first associated parameter is obtained by at least a sensor of the first acquisition device.

7. The apparatus of claim 5, wherein the first set of pixel beams are comprised of volumetric rays.

8. The apparatus of claim 5, wherein the non-physical optical system is a different optical system than the first optical system.

9. The method of claim 1, wherein the grid elements on the projection surface are a pixel grid.

10. The method of claim 1, further comprising accumulating values of parameters associated with the imaged pixel beams based on location within a restitution pupil defined in the non-physical optical system.

11. The apparatus of claim 5, wherein the grid elements on the projection surface are a pixel grid.

12. A non-transitory computer readable medium storing instructions that, when executed by one or more processors, perform the method of claim 1.

* * * * *